United States Patent
Kobayashi et al.

(10) Patent No.: US 10,884,700 B2
(45) Date of Patent: Jan. 5, 2021

(54) SOUND OUTPUTTING DEVICE, SOUND OUTPUTTING METHOD, AND SOUND OUTPUTTING PROGRAM STORAGE MEDIUM

(71) Applicant: Toyota Jidosha Kabushiki Kaisha, Toyota (JP)

(72) Inventors: Hideki Kobayashi, Miyoshi (JP); Akihiro Muguruma, Nagoya (JP); Yukiya Sugiyama, Toyota (JP); Shota Higashihara, Chiryu (JP); Riho Matsuo, Nagoya (JP); Naoki Yamamuro, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 99 days.

(21) Appl. No.: 16/223,811

(22) Filed: Dec. 18, 2018

(65) Prior Publication Data
US 2019/0196780 A1    Jun. 27, 2019

(30) Foreign Application Priority Data
Dec. 27, 2017 (JP) ................. 2017-251740

(51) Int. Cl.
*G06F 3/16* (2006.01)
*G10L 13/033* (2013.01)
*G10L 25/51* (2013.01)

(52) U.S. Cl.
CPC .......... *G06F 3/167* (2013.01); *G10L 13/0335* (2013.01); *G10L 25/51* (2013.01)

(58) Field of Classification Search
CPC ....... G10L 13/10; G10L 19/18; G10L 13/033; G10L 13/00; G10L 13/02; G10L 13/0335; G10L 19/038; G10L 19/07; G10L 19/12; G10L 2019/0005; G10L 25/51; G10L 25/90; G10L 13/047; G10L 19/0216; G10L 19/06; G10L 15/26; G10L 2015/223; G10G 1/00; G10G 3/04; G10G 1/02
See application file for complete search history.

(56) References Cited

U.S. PATENT DOCUMENTS

| 2005/0143915 A1* | 6/2005 | Odagawa ........... G01C 21/3629 701/443 |
| 2016/0180853 A1 | 6/2016 | VanLund et al. |
| 2017/0083285 A1 | 3/2017 | Meyers et al. |
| 2018/0286426 A1* | 10/2018 | Abramson .............. A63F 13/54 |

FOREIGN PATENT DOCUMENTS

JP    2005-079767 A    3/2005

* cited by examiner

*Primary Examiner* — Huyen X Vo
(74) *Attorney, Agent, or Firm* — Dinsmore & Shohl LLP

(57) ABSTRACT

A sound outputting device includes: a receiving section that receives driving information that supports driving of a moving body; a sound outputting section that outputs at least one of a musical piece currently playing or a voice that gives notice of the driving information; and an outputting section that, during playing of the musical piece, causes the sound outputting section to output the voice that gives notice of the driving information received by the receiving section so as to match at least one of a pitch or a tune of the musical piece that is currently playing.

4 Claims, 6 Drawing Sheets

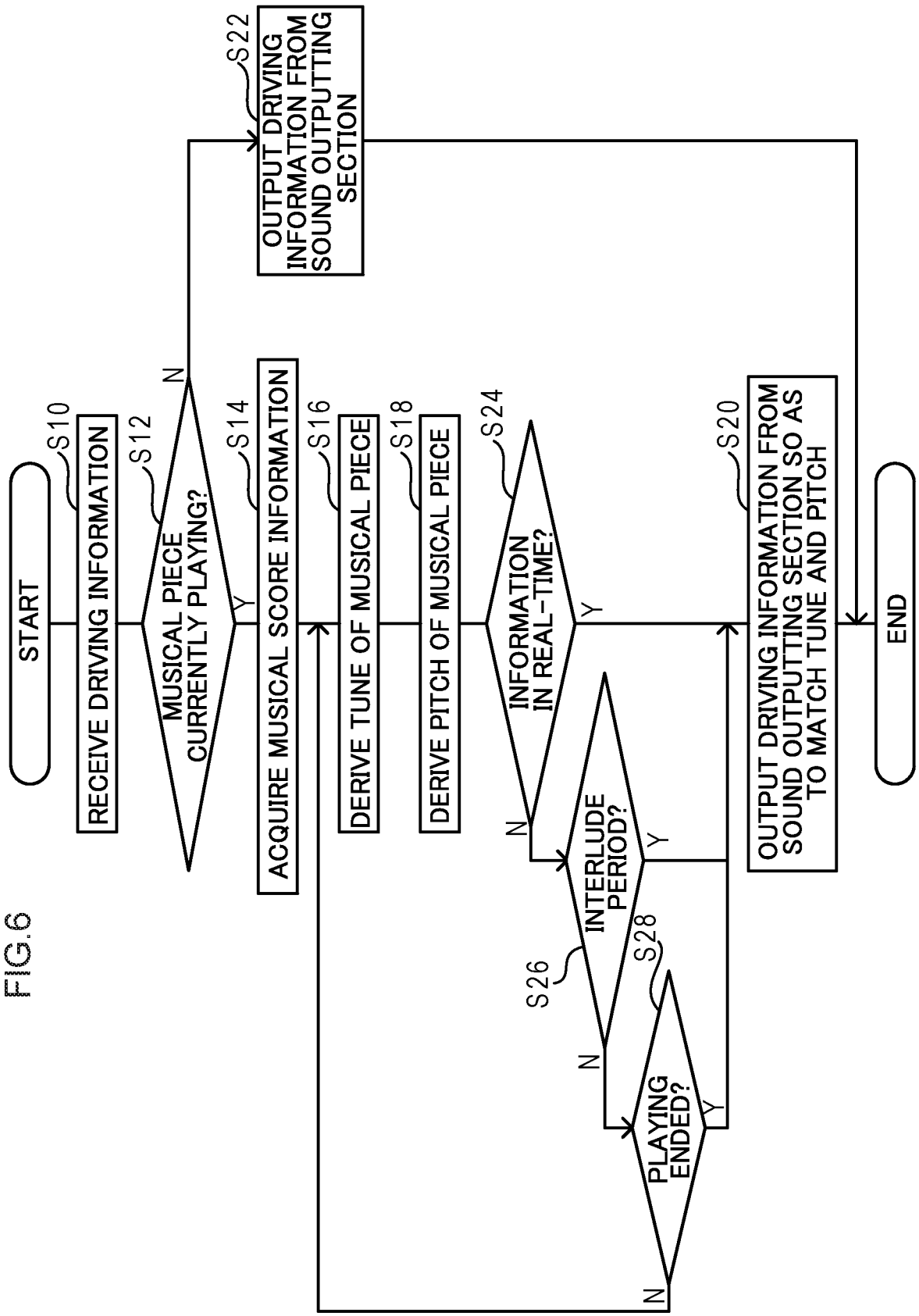

SOUND OUTPUTTING DEVICE, SOUND OUTPUTTING METHOD, AND SOUND OUTPUTTING PROGRAM STORAGE MEDIUM

CROSS-REFERENCE TO RELATED APPLICATION

This application is based on and claims priority under 35 USC 119 from Japanese Patent Application No. 2017-251740 filed on Dec. 27, 2017, the disclosure of which is incorporated by reference herein.

BACKGROUND

Technical Field

The present disclosure relates to a sound outputting device, a sound outputting method, and a sound outputting program storage medium.

Related Art

Japanese Patent Application Laid-Open (JP-A) No. 2005-79767 discloses a technique of correcting a voice, which is output from a navigation device, in accordance with the level of surrounding noise.

For example, when a voice, which gives notice of driving information, output from a device that supports the driving of a moving body such as a car navigation system or the like, and a musical piece, which is output from a device that plays musical pieces, are being played simultaneously in a state in which the difference between the pitches thereof or the melodies thereof is large, there are cases in which the voice for giving notice of the driving information will interfere with the musical piece that is currently playing. In this case, the user cannot pleasantly listen to the musical piece that is currently playing. The above-described technique does not consider this point.

SUMMARY

The present disclosure has been made in view of the above-described circumstances, and provides a sound outputting device, a sound outputting method and a sound outputting program storage medium that may suppress interference of a voice, which gives notice of driving information, with a musical piece that is currently playing.

A first aspect of the present disclosure is a sound outputting device including: a receiving section that receives driving information that supports driving of a moving body; a sound outputting section that outputs at least one of a musical piece currently playing or a voice that gives notice of the driving information; and an outputting section that, during playing of the musical piece, causes the sound outputting section to output the voice that gives notice of the driving information received by the receiving section so as to match at least one of a pitch or a tune of the musical piece that is currently playing.

In accordance with the first aspect, during playing of a musical piece from the sound outputting section, a voice that gives notice of driving information is output from the sound outputting section so as to match at least one of the pitch and the tune of the musical piece that is currently playing. Accordingly, the voice, which gives notice of the driving information, interfering with the musical piece that is currently playing may be suppressed.

In the first aspect, in a case in which the driving information is information that is not in real-time, the outputting section causes the sound outputting section to output the voice that gives notice of the driving information during an interlude period of the musical piece that is currently playing.

In accordance with the above structure, in a case in which the driving information is information that is not in real-time, the voice that gives notice of the driving information is output from the sound outputting section during an interlude period of the musical piece that is currently playing. Accordingly, the voice, which gives notice of the driving information, interfering with the musical piece that is currently playing may be suppressed more effectively.

A second aspect of the present disclosure is a sound outputting method that includes: receiving driving information that supports driving of a moving body; and during playing of a musical piece by a sound outputting section, outputting, by the sound outputting section, a voice that gives notice of the received driving information so as to match at least one of a pitch or a tune of the musical piece that is currently playing.

In accordance with the second aspect, the voice, which gives notice of the driving information, interfering with the musical piece that is currently playing may be suppressed.

A third aspect of the present disclosure is a non-transitory storage medium storing a program that causes a computer to execute sound outputting processing, the sound outputting processing including: receiving driving information that supports driving of a moving body; and during playing of a musical piece by a sound outputting section, outputting, by the sound outputting section to, a voice that gives notice of the received driving information so as to match at least one of a pitch or a tune of the musical piece that is currently playing.

In accordance with the third aspect, the voice, which gives notice of the driving information, interfering with the musical piece that is currently playing may be suppressed.

BRIEF DESCRIPTION OF THE DRAWINGS

FIG. 6 is a flowchart illustrating an example of sound outputting processing relating to the second embodiment.

DETAILED DESCRIPTION

Embodiments of the present disclosure are described in detail hereinafter with reference to the drawings.

First Embodiment

Figure 1:
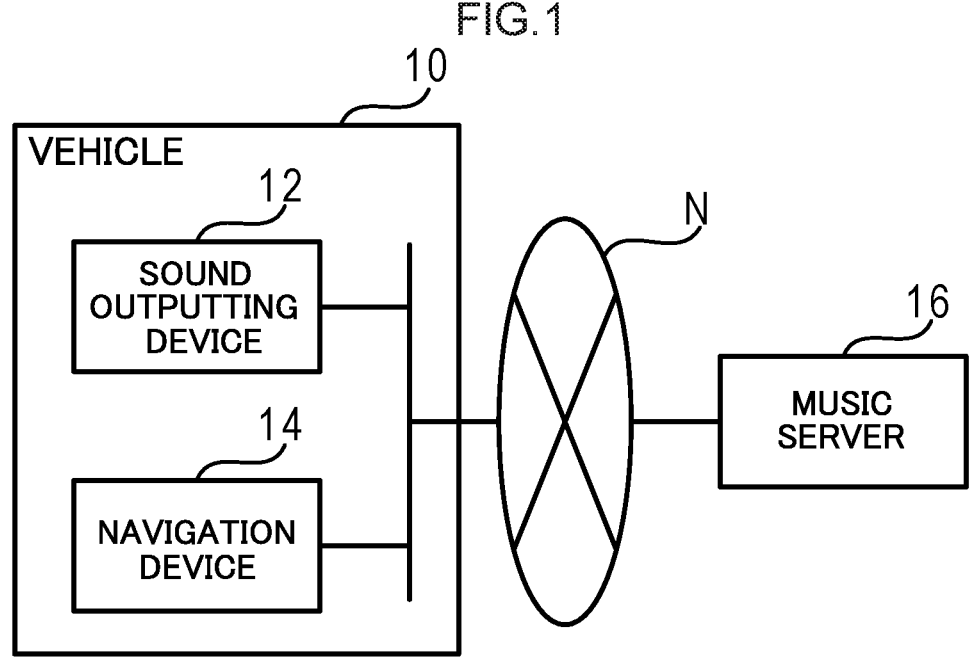
FIG. 1 is a block diagram illustrating an example of the structure of a vehicle relating to respective embodiments.

First, structures of a vehicle 10, which serves as an example of a moving body relating to the present embodiment, are described with reference to FIG. 1. As illustrated in FIG. 1, a sound outputting device 12, which outputs, by voice, a response to a speech of an occupant of the vehicle, is set within the vehicle 10 relating to the first embodiment. The sound outputting device 12 is, for example, brought into the vehicle 10 interior by an occupant of the vehicle 10.

A navigation device 14 such as a car navigation system or the like, which supports driving of the vehicle 10, is provided within the vehicle 10. The navigation device 14 is provided at the center console, for example.

The sound outputting device 12 and the navigation device 14 are connected to an onboard network so as to be able to communicate with one another. Further, the sound outputting device 12 may communicate with a music server 16 via a network N such as the internet or the like. The music server 16 stores musical piece data that expresses the sounds of musical pieces, musical score information of musical pieces, and the like.

Based on route information from the current position of the vehicle 10 to a destination, for example, the navigation device 14 transmits, to the sound outputting device 12 via the onboard network, driving information that supports driving of the vehicle 10 such as, for example, "Turn right at the intersection 10 meters ahead." or the like.

Figure 2:
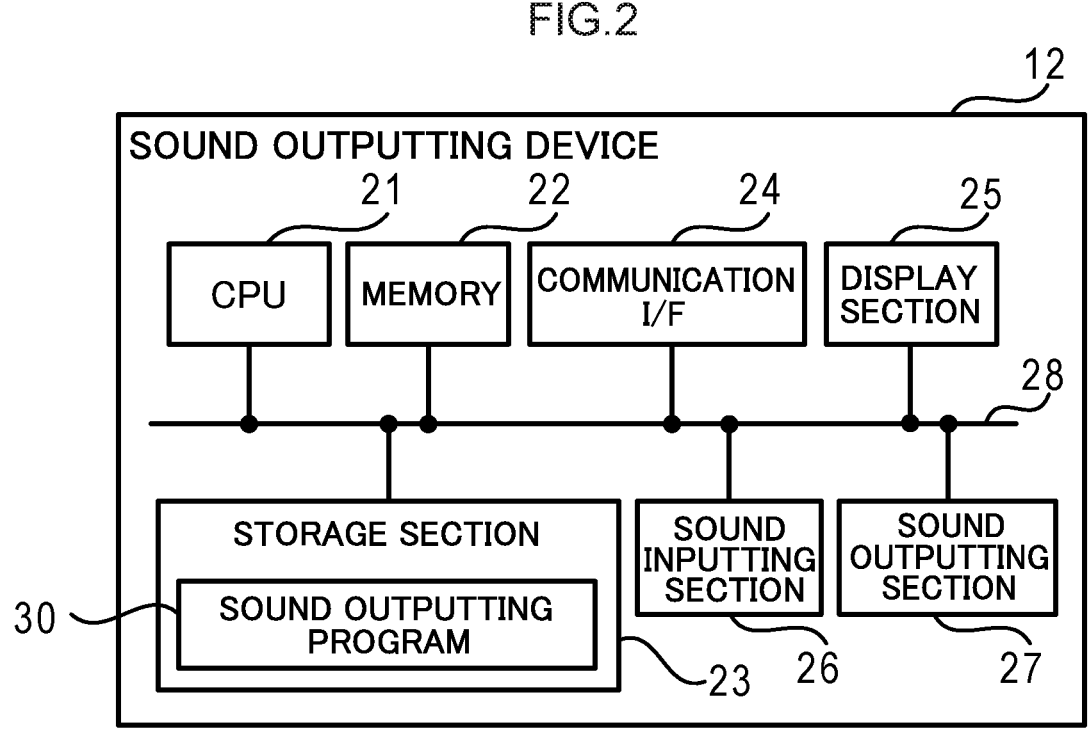
FIG. 2 is a block diagram illustrating hardware structures of sound outputting devices relating to the respective embodiments.

The hardware structures of the sound outputting device 12 are described next with reference to FIG. 2. As illustrated in FIG. 2, the sound outputting device 12 includes a central processing unit (CPU) 21, a memory 22 that serves as a temporary storage region, and a non-volatile storage section 23. Further, the sound outputting device 12 includes a communication interface (I/F) 24 used at the time of carrying out communication with external devices, a display section 25 such as a liquid crystal display or the like, a sound inputting section 26 such as a microphone or the like, and a sound outputting section 27 such as a speaker or the like that outputs information into the vehicle cabin by a sound or voice. The CPU 21, the memory 22, the storage section 23, the communication I/F 24, the display section 25, the sound inputting section 26 and the sound outputting section 27 are connected to a bus 28. A sound outputting program 30 is stored in the storage section 23. An artificial intelligence (AI) speaker, a smart phone and the like are examples of the sound outputting device 12.

When an instruction to play a musical piece (e.g., "Play a musical piece by singer A." or the like), spoken by an occupant of the vehicle, is inputted via the sound inputting section 26 to the sound outputting device 12 relating to the first embodiment, the sound outputting device 12 acquires, from the music server 16 and via the network N, musical piece data corresponding to the play instruction. Then, the sound outputting device 12 plays the musical piece by outputting the music, which is expressed by the acquired musical piece data, from the sound outputting section 27.

Figure 3:
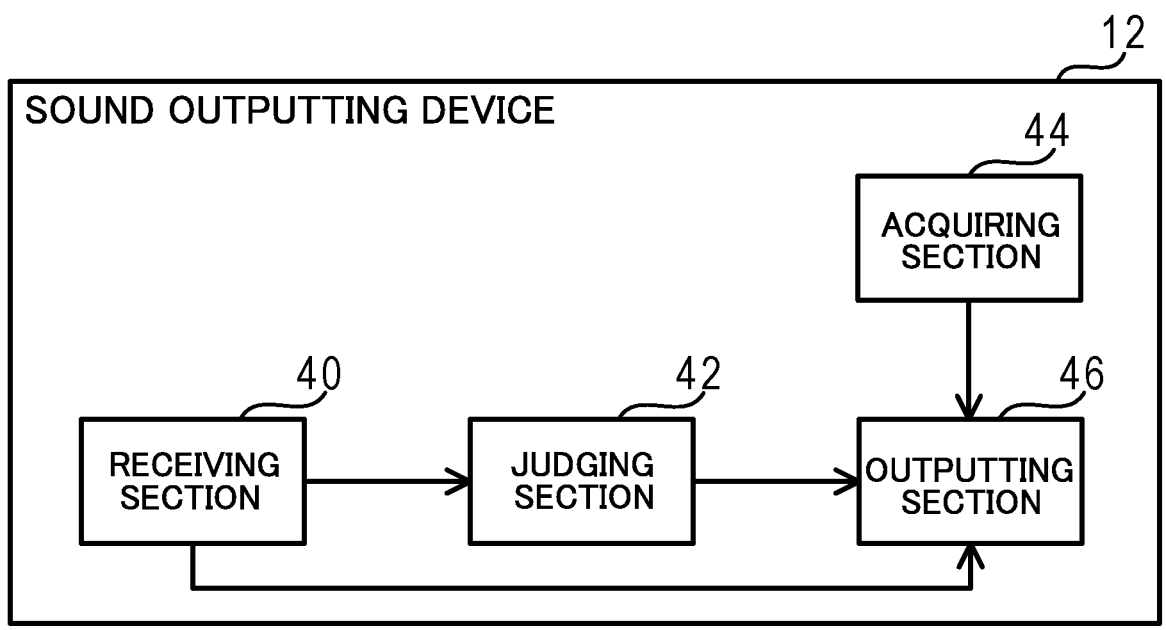
FIG. 3 is a block diagram illustrating an example of functional structures of a sound outputting device relating to a first embodiment.

Next, the functional structures of the sound outputting device 12 relating to the first embodiment are described with reference to FIG. 3. As illustrated in FIG. 3, the sound outputting device 12 includes a receiving section 40, a judging section 42, an acquiring section 44 and an outputting section 46. By executing the sound outputting program 30 that is stored in the storage section 23, the CPU 21 of the sound outputting device 12 functions as the receiving section 40, the judging section 42, the acquiring section 44 and the outputting section 46 that are illustrated in FIG. 3.

The receiving section 40 receives driving information that is transmitted from the navigation device 14. The judging section 42 judges whether or not a musical piece is currently playing by the sound outputting section 27. The acquiring section 44 acquires musical score information of the musical piece that is currently playing, from the music server 16 via the network N.

In a case in which it is judged by the judging section 42 that a musical piece is not currently playing, the outputting section 46 outputs, from the sound outputting section 27 and by a predetermined voice, a voice that gives notice of the driving information received from the receiving section 40.

Further, in a case in which is it judged by the judging section 42 that a musical piece is currently playing, by using the musical score information acquired by the acquiring section 44, the outputting section 46 derives the tune such as the rhythm and the tempo and the like at the current playback position (e.g., the elapsed time from the start of the musical piece) of the musical piece that is currently playing. Further, by using the musical score information acquired by the acquiring section 44, the outputting section 46 derives the pitch at the current playback position of the musical piece that is currently playing. Note that the outputting section 46 may derive the tune and the pitch at the current playback position of the musical piece that is currently playing, by analyzing the musical piece data of the musical piece that is currently playing.

The outputting section 46 outputs the voice, which gives notice of the driving information received by the receiving section 40, from the sound outputting section 27 so as to match the derived tune and pitch and so as to be superposed on the musical piece that is currently playing. Namely, the driving information is outputted, together with the musical piece that is currently playing and from the sound outputting section 27, by a voice that has a similar tune (a similar rhythm and a similar tempo) and a similar pitch (a similar frequency) as the musical piece that is currently playing.

Figure 4:
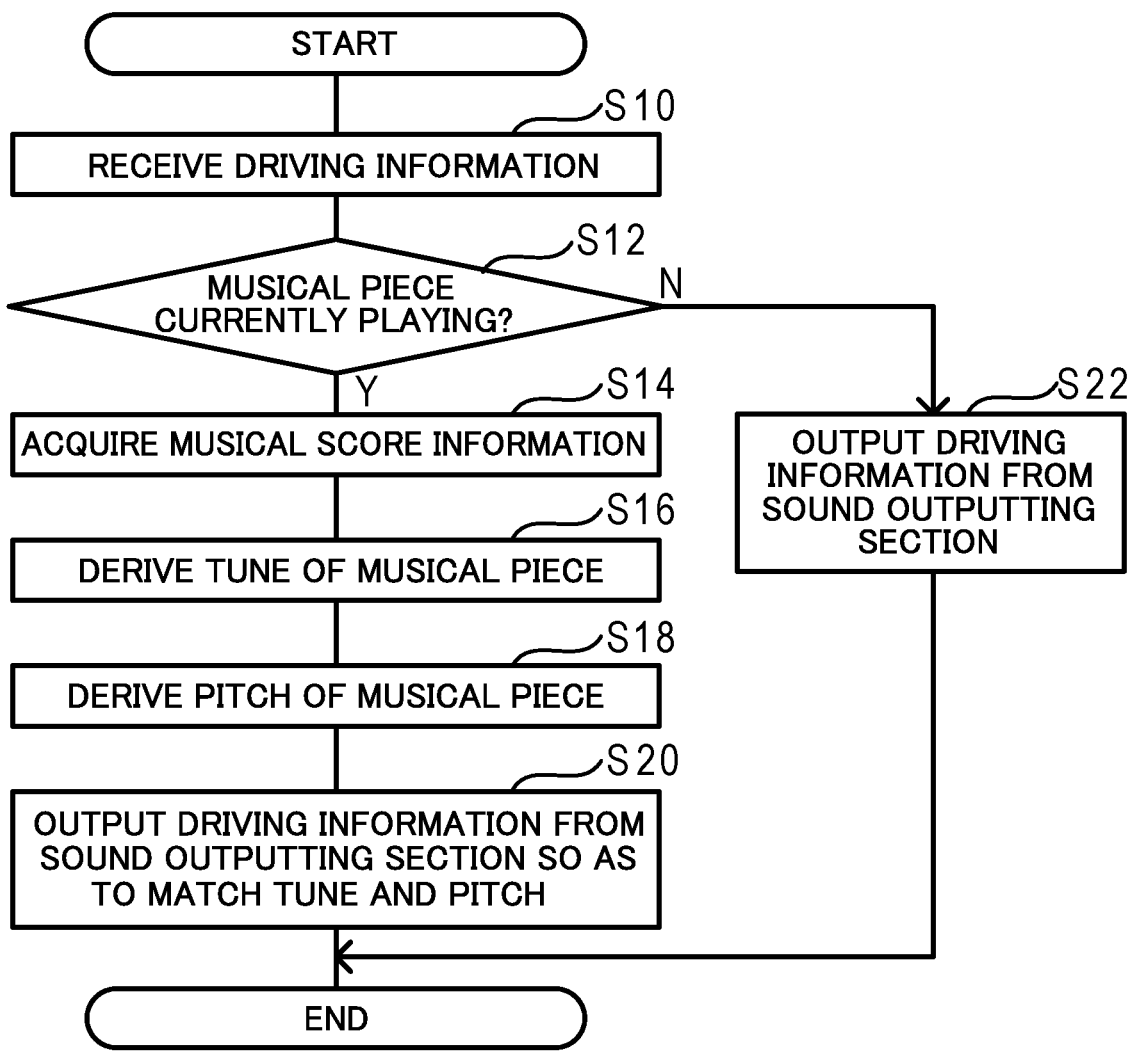
FIG. 4 is a flowchart illustrating an example of sound outputting processing relating to the first embodiment.

Operation of the sound outputting device 12 relating to the first embodiment is described next with reference to FIG. 4. FIG. 4 is a flowchart illustrating an example of the flow of sound outputting processing executed by the CPU 21 of the sound outputting device 12 relating to the first embodiment. In the first embodiment, the sound outputting processing illustrated in FIG. 4 are executed due to the CPU 21 executing the sound outputting program 30 that has been stored in advance in the storage section 23. Further, the sound outputting processing illustrated in FIG. 4 are executed, for example, in a case in which the sound outputting device 12 receives, via the communication I/F 24, driving information that has been transmitted from the navigation device 14.

In step S10 of FIG. 4, the receiving section 40 receives driving information transmitted from the navigation device 14. In step S12, the judging section 42 judges whether or not a musical piece is currently playing by the sound outputting section 27. If this judgment is affirmative, the routine moves on to step S14.

In step S14, the acquiring section 44 acquires musical score information of the musical piece that is currently playing, from the music server 16 and via the network N. In step S16, as described above, the outputting section 46 derives the tune at the current playback position of the musical piece that is currently playing, by using the musical score information acquired by the processing of step S14.

In step S18, as described above, the outputting section 46 derives the pitch at the current playback position of the musical piece that is currently playing, by using the musical score information acquired by the processing of step S14. In step S20, the outputting section 46 outputs a voice, which gives notice of the driving information received by the processing of step S10, from the sound outputting section 27 so as to be superposed on the musical piece that is currently playing and so as to match the tune and the pitch that have been derived by the processing of steps S16 and S18. After the processing of step S20 ends, the sound outputting processing ends.

However, if the judgment of step S12 is negative, the routine moves on to step S22. In step S22, the outputting section 46 outputs a voice, which gives notice of the driving information received by the processing of step S10, from the sound outputting section 27 by a predetermined voice (i.e., without changing the voice). After the processing of step S22 ends, the sound outputting processing ends.

As described above, in accordance with the first embodiment, a voice that gives notice of driving information is output from the sound outputting section 27 so as to match the pitch and the tune of the musical piece that is currently playing. Accordingly, interference of the voice, which gives notice of the driving information, with the musical piece that is currently playing may be suppressed.

Second Embodiment

A second embodiment is described next. The structures of the vehicle 10 and the hardware structures of the sound outputting device 12 of the second embodiment are similar to those of the first embodiment (refer to FIG. 1 and FIG. 2) and, therefore, description thereof is omitted.

Figure 5:
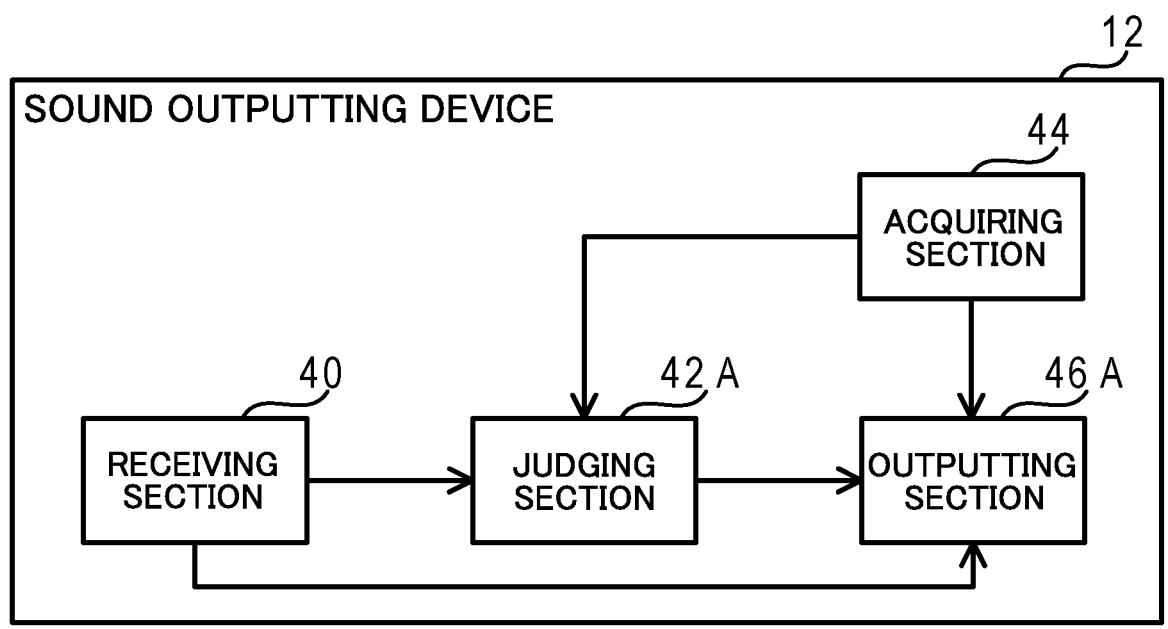
FIG. 5 is a block diagram illustrating an example of functional structures of a sound outputting device relating to a second embodiment.

First, the functional structures of the sound outputting device 12 relating to the second embodiment are described with reference to FIG. 5. The functional sections in FIG. 5, which have functions similar to those of FIG. 3, are denoted by the same reference numerals, and description thereof is omitted. As illustrated in FIG. 5, the sound outputting device 12 includes the receiving section 40, a judging section 42A, the acquiring section 44, and an outputting section 46A. By executing the sound outputting program 30 stored in the storage section 23, the CPU 21 of the sound outputting device 12 functions as the receiving section 40, the judging section 42A, the acquiring section 44 and the outputting section 46A illustrated in FIG. 5.

The judging section 42A judges whether or not a musical piece is currently playing by the sound outputting section 27. The judging section 42A also judges whether or not the current playing of the musical piece by the sound outputting section 27 has ended. Further, by using the musical score information acquired from the acquiring section 44, the judging section 42A judges whether or not the current playback position of the musical piece that is currently playing is a position corresponding to an interlude period.

The judging section 42A judges whether or not the driving information that is received from the receiving section 40 is information in real-time. For example, the judging section 42A judges that the driving information is not in real-time in a case in which the driving information is information expressing that steering driving will not be needed during a time period obtained by adding a predetermined margin to the playback time period of the voice giving notice of the driving information, such as "Stay on this road for the next 5 km." Alternatively, for example, the navigation device 14 may also transmit, to the sound outputting device 12, driving information to which information that expresses whether or not this driving information is in real-time has been appended. In this case, the judging section 42A judges whether or not the driving information is in real-time based on the information appended to the driving information.

In a case in which the judging section 42A judges that a musical piece is not currently playing, the outputting section 46A outputs a voice, which gives notice of the driving information received by the receiving section 40, from the sound outputting section 27 in a predetermined voice.

In a case in which the judging section 42A judges that a musical piece is currently playing and that the driving information is not in real time, the outputting section 46A carries out the following processing when the judging section 42A judges that the current playback position of the musical piece currently playing is a position corresponding to an interlude period. Namely, in this case, in the same way as the outputting section 46 relating to the first embodiment, the outputting section 46A outputs a voice, which gives notice of the driving information received by received by the receiving section 40, from the sound outputting section 27 so as to be superposed on the musical piece that is currently playing and so as to match the derived tune and pitch of the musical piece.

In a case in which the current playing of the musical piece ends while it is being judged by the judging section 42A that a musical piece is currently playing, that the driving information is not in real-time, and that the current playback position of the musical piece is not an interlude period, the outputting section 46A carries out the following processing after the current playing of the musical piece has been ended. Namely, in this case, after the current playing of the musical piece has ended, the outputting section 46A outputs a voice, which gives notice of the driving information received by received by the receiving section 40, from the sound outputting section 27 so as to match the derived tune and pitch of the musical piece.

Operation of the sound outputting device 12 relating to the second embodiment is described next with reference to FIG. 6. FIG. 6 is a flowchart illustrating an example of the flow of sound outputting processing that are executed by the CPU 21 of the sound outputting device 12 relating to the present embodiment. In the second embodiment, the sound outputting processing illustrated in FIG. 6 is executed due to the CPU 21 executing the sound outputting program 30 stored in advance in the storage section 23. The sound outputting processing illustrated in FIG. 6 is executed, for example, in a case in which the sound outputting device 12 receives, via the communication I/F 24, driving information that has been transmitted from the navigation device 14. Note that steps in FIG. 6 that execute the same processing as in FIG. 4 are denoted by the same step numbers, and description thereof is omitted.

After the processing of step S18 of FIG. 6 ends, the routine moves on to step S24. In step S24, as described above, the judging section 42A judges whether or not the driving information, which has been received by the processing of step S10, is information in real-time. If this judgment is affirmative, the routine moves on to step S20. If this judgment is negative, the routine moves on to step S26.

In step S26, as described above, by using the musical score information acquired by the processing of step S14, the judging section 42A judges whether or not the current playback position of the musical piece that is currently playing is a position corresponding to an interlude period. If this judgment is affirmative, the routine moves on to step S20. If this judgment is negative, the routine moves on to step S28.

In step S28, the judging section 42A judges whether or not current playing of the musical piece by the sound outputting section 27 has ended. If this judgment is affirmative, the routine moves on to step S20. If this judgment is negative, the routine returns to step S16.

As described above, in accordance with the second embodiment, effects that are similar to those of the first embodiment may be achieved. Further, in accordance with the second embodiment, in a case in which the driving information is information that is not in real-time, the voice that gives notice of the driving information is outputted from the sound outputting section 27 during an interlude period of the musical piece that is currently playing. Accordingly, the voice, which gives notice of the driving information, interfering with the musical piece that is currently playing may be suppressed more effectively.

Note that the above-described respective embodiments describe cases in which, when a musical piece is currently being played from the sound outputting section 27, the voice that gives notice of the driving information is outputted from the sound outputting section 27 in accordance with both the pitch and the tune of the musical piece currently playing. However, the disclosure is not limited to this. There may be a mode in which, while a musical piece is being played from the sound outputting section 27, a voice that gives notice of the driving information is outputted from the sound outputting section 27 so as to match at least one of the pitch or the tune of the musical piece that is currently playing.

Further, in the above-described respective embodiments, the sound outputting device 12 and the navigation device 14 may be realized by a single device.

Further, although description has been given of a case in which the processing that is carried out by the CPU 21 in the above-described embodiments are software processing that is carried out by the execution of a program, the disclosure is not limited to this and the processing may be carried out by hardware. Or, the processing carried out by the CPU 21 may be processing that is carried out by a combination of both hardware and software. Moreover, the sound outputting program 30 stored in the storage section 23 may be alternatively stored on any of various types of storage media and may be distributed.

The present disclosure is not limited to the above-described embodiments, and, other than the above-described embodiments, may obviously be implemented by being modified in various ways within a scope that does not depart from the gist of the disclosure.

What is claimed is:

1. A sound outputting device comprising:
   a memory;
   a sound outputting section that outputs at least one of a musical piece currently playing or a voice that gives notice of driving information; and
   a processor coupled to the memory, the processor configured to:
   receive driving information that supports driving of a moving body;
   acquire, from a music server, musical score information of a musical piece that is currently playing;
   derive a tune at a current playback position of the musical piece that is currently playing based on the musical score information;
   derive a pitch at the current playback position of the musical piece that is currently playing based on the musical score information; and
   during playing of the musical piece, cause the sound outputting section to output the voice that gives notice of the received driving information so as to match the tune at the current playback position of the musical piece that is currently playing and the pitch at the current playback position of the musical piece that is currently playing.

2. The sound outputting device of claim 1, wherein the processor is configured to, in a case in which the driving information is information that is not in real-time, cause the sound outputting section to output the voice that gives notice of the driving information during an interlude period of the musical piece that is currently playing.

3. A sound outputting method comprising:
   receiving driving information that supports driving of a moving body;
   acquiring, from a music server, musical score information of a musical piece that is currently playing;
   deriving a tune at a current playback position of the musical piece that is currently playing based on the musical score information;
   deriving a pitch at the current playback position of the musical piece that is currently playing based on the musical score information; and
   during playing of the musical piece by a sound outputting section, outputting, by the sound outputting section, a voice that gives notice of the received driving information so as to match the tune at the current playback position of the musical piece that is currently playing and the pitch at the current playback position of the musical piece that is currently playing.

4. A non-transitory storage medium storing a program that causes a computer to execute sound outputting processing, the sound outputting processing comprising:
   receiving driving information that supports driving of a moving body;
   acquiring, from a music server, musical score information of a musical piece that is currently playing;
   deriving a tune at a current playback position of the musical piece that is currently playing based on the musical score information;
   deriving a pitch at the current playback position of the musical piece that is currently playing based on the musical score information; and
   during playing of the musical piece by a sound outputting section, outputting, by the sound outputting section, a voice that gives notice of the received driving information so as to match the tune at the current playback position of the musical piece that is currently playing and the pitch at the current playback position of the musical piece that is currently playing.

* * * * *

UNITED STATES PATENT AND TRADEMARK OFFICE
CERTIFICATE OF CORRECTION

PATENT NO. : 10,884,700 B2
APPLICATION NO. : 16/223811
DATED : January 5, 2021
INVENTOR(S) : Hideki Kobayashi et al.

It is certified that error appears in the above-identified patent and that said Letters Patent is hereby corrected as shown below:

On the Title Page

Item (72), Inventor 1, city, delete "Miyoshi" and insert --Miyoshi-shi Aichi-ken--, therefor.

Item (72), Inventor 2, city, delete "Nagoya" and insert --Nagoya-shi Aichi-ken--, therefor.

Item (72), Inventor 3, city, delete "Toyota" and insert --Toyota-shi Aichi-ken--, therefor.

Item (72), Inventor 4, city, delete "Chiryu" and insert --Chiryu-shi Aichi-ken--, therefor.

Item (72), Inventor 5, city, delete "Nagoya" and insert --Nagoya-shi Aichi-ken--, therefor.

Item (72), Inventor 6, city, delete "Nagoya" and insert --Nagoya-shi Aichi-ken--, therefor.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*